United States Patent Office 3,346,447
Patented Oct. 10, 1967

3,346,447
COMPOSITIONS AND METHODS FOR PROTECTING PLANTS WITH METAL DERIVATIVES OF HEXACHLOROPHENE
Wilburn T. Wright, 4460 Lagg Ave.,
Fort Myers, Fla. 33901
No Drawing. Filed Mar. 27, 1963, Ser. No. 268,441
8 Claims. (Cl. 167—31)

The present invention relates to novel organic compounds, more particularly to heavy metal salts of hexachlorophene and related compounds. Such materials have unique toxicity to many lower forms of animal and plant life which makes them useful in the protection of growing plants against attack by fungi, bacteria, insects and other common enemies and/or parasites. These properties are especially marked when applied to field crops and other varieties of useful plants growing in the open, it being understood, of course, that they are sufficiently effective when applied to plants growing in greenhouses, seed plots, pots, and other more protected environments.

In Patent No. 2,250,480, there is disclosed a method for producing certain derivatives of hexachlorophene. The method therein described, however, does not yield the true metal salts of hexachlorophene. The same is true of the process disclosed in Patent No. 2,272,267, as the product thereof is not a true zinc salt of hexachlorophene.

On the contrary, I am able by the procedures hereinafter disclosed to produce true salts of hexachlorophene, more particularly certain heavy metal salts thereof which have new and useful properties significantly different from the products of the prior art.

I am also aware of Patents No. 2,272,268, No. 2,353,-724, No. 2,354,012, No. 2,354,013, and 2,435,953. None of these prior patents, however, describes my novel derivatives of hexachlorophene nor my new and improved process for making metal derivatives of hexachlorophene.

It is an object of my invention to produce novel metal salts of hexachlorophene.

Another object of my invention is to prepare compositions for protecting growing crops against infections caused by microorganisms such as fungi, bacteria and viruses and certain insects.

It is a further object of my invention to stimulate the growth of annual crops by treating the seeds before or after planting.

Still another object is the preservation of fabrics, plastics, leather, wood and other organic materials by treatment thereof with my new compositions.

These and other objects, together with many of the attendant advantages will be readily appreciated as the same becomes better understood by reference to the following detailed description and examples.

The new compounds of my invention are metal derivatives of bis - (3,5,6 - trichloro - 2 hydroxy - phenyl) methane, which compound is also known by the popular name hexachlorophene.

Such compounds may be represented by the following structural formulas:

(1)
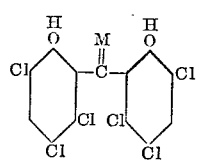

wherein M is a divalent metal from the group consisting of manganese, zinc, iron, nickel and copper.

(2)
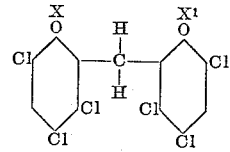

wherein X and $X^1$ may be the same or a different radical from the group consisting of sodium, potassium, lithium and ammonium.

The process for making the metal salts of hexachlorophene as described above consists of dissolving the proper amount of hexachlorophene in anhydrous alcohol; next dissolve the proper amount of the metal in anhydrous alcohol; heat the solutions to a temperature of 50° C.; mix the solutions slowly together and stir. The reaction is non-violent. The resulting solution of the metal salt in alcohol is then distilled, reclaiming the alcohol and proceeding to a dry powder.

The same procedure can also be followed to make the alkali and di-alkali salts of hexachlorophene.

Methyl alcohol has been the solvent employed in this process, though other alcohols and solvents could be substituted such as ethyl alcohol, isopropyl alcohol or acetone.

The di-alkali salts and the mono-alkali salts are more soluble than the metal salts but the latter form good dispersions in water.

Inasmuch as I am primarily interested in, but not restricted to, applications of my invention on growing crops, where costs rather than exceptional purity of product is a major factor, my invention can be produced more economically by utilizing unpurified hexachlorophene in its heat induced liquid form prior to its crystallization in its manufacturing process. After the initial reaction of the 2,4,5 trichlorophenol with the formaldehyde is made, the hot liquid form of hexachlorophene can be dissolved in alcohol and reacted with the alcoholic solution of a metal whose valence is 2 to give that metal salt of hexachlorophene.

Likewise the alkali salts can be produced by reacting the hot liquid hexachlorophene in alcohol with the alcoholic solution of the alkali whose valence is 1 to form that particular alkali salt. In both cases the new compound is recovered by distilling with the alcohol being reclaimable and leaving a dry powder which is the compound.

Part of my invention lies in the economical, efficient and practical use of these compounds on or for growing plants, to be used in such manner as to give adequate control of various diseases without harmful injury to the plant. These compounds have been found to be extremely valuable and effective on various disease problems directly on and related to growing plants.

The mono-sodium salt and the di-sodium salt of hexachlorophene has been found to give control of seedling root-rot, damping-off, or soreshin of cotton caused by such organisms as *Rhizoctonia solani*, *Pythium* sp., and *Fusarium* at rates of application as low as 3.0 grams per acre and possibly as low as 1.0 gram per acre. It has shown control of downy mildew of cucumbers (*Peronospora cubensis*) at rates of ½ pt. to 1 qt. of a 10% formulation per 100 gals. of water per acre when applied at twice weekly intervals with good coverage with conventional power driven sprayers. When used at heavy rates (approx. 32 lb.) per acre one week ahead of planting, it gave control of Fusarium wilt of tomatoes and doubled the weight of the tomato plants six months after the application. At 25 lbs. per acre applied ahead of planting of radishes, control of bacterial spot (*Xanthomonas vesicatorium*) was obtained.

The responses gained from the mono-sodium salt of hexachlorophene in control of soil borne diseases of plants are unique and novel although related in some ways to my co-pending application No. 734,851, dated May 13, 1958, now abandoned. While hexachlorophene, used at extremely low dosages, controls one primary soil disease—*Rhizoctonia solani*—in an indirect manner, a companion fungicide is needed to give control of other soil-borne diseases. The mono-sodium or di-sodium salt needs no companion fungicide, but gives excellent control of the broad spectrum of pathogenic diseases attacking seedling plants at extremely low dosages. The long-lasting control obtained by using heavy amounts prior to seeding the crop without plant injury is unique with any non-volatile compound. It is believed that a further reaction takes place in the soil—perhaps a reaction with metallic ions which would be more insoluble and therefore long-lasting.

An integral part of my invention is the method of controlling soil-borne organisms attacking plants. It is well-known in the literature that hundreds of various organisms exist in the soil, many of them being pathogenic to plants. It is well known that many antagonisms exist in the soil and that those organisms in the soil which attack plants have enemies or antagonists which in turn have enemies or other organisms antagonistic to them.

When a most active chemical, which is effective on certain gram-positive bacteria at very low dosages, is applied to the area around seeds or seedling plants in increasingly lower dosages, a point is reached where much better control of the plant pathogens is obtained than at higher dosages which are still well below phytotoxicity levels. This phenomenon indicates strongly that control is being gained *indirectly*. I have found that I can gain control of the pathogenic organisms attacking plants with dosages as low as 1–5 grams per acre of active ingredient of the chemical when formulated as dusts or sprays. At such low dosage I have found very little effect of the chemicals directly against *Trichoderma viride,* an organism known to be an enemy of principal plant pathogens living in the soil such as *Rhizoctonia solani* and Pythium sp. nor directly on the latter group of plant pathogens. Yet excellent control of the latter group is attained by killing the predators or enemies of Trichoderma, which then builds up very rapidly and tends to kill out the Rhizoctonia and Pythium organisms.

In this method of control of these most vicious soil-borne diseases attacking plants, I have utilized my chemical inventions. However, it is believed that other chemical agents could be utilized in this same method of control which I have invented. More specifically, I have invented a method of control of soil-borne diseases attacking plants whereby a broad-spectrum chemical known to be effective on gram positive bacteria at extremely low dosages is utilized in spray or dust form around the seeds or plants at the amounts and *concentration* needed which is below the level necessary to control *Trichoderma viride* and other antagonists of *Rhizoctonia solani* and Pythium sp. It is believed that this method of plant disease control is certainly unique and novel. Chemicals found that can be utilized in this method of disease control are the alkali salts of hexachlorophene and the metal salts of hexachlorophene.

The heavy metal salts of hexachlorophene have shown greater activity on some problems than the alkali salts. The zinc salt of hexachlorophene has given excellent control of rust mite of citrus; of black spot of roses; and of seedling diseases of beans. The manganese salt has given control of bacterial spot of peaches (*Xanthomonas pruni*); it has shown control of late blight of tomato (*Phytopthera infestans*) and gray-leaf spot of tomato (*Stemphyllium solani*); it has shown excellent control of the soil borne disease complexes attacking seedling plants.

The heavy metal salts may be formulated as emulsions or emulsifiable concentrates or may be used as wettable powders or dusts.

With this entire range of compounds, activity on plant diseases appears to be that of killing out or eradication. The more insoluble materials are used for their longer lasting effects while the more soluble compounds such as the di-sodium or other di-alkali salts are used where solubility and penetration is desired, such as in better control of soil-borne diseases where soils can be penetrated.

Though the primary value of my inventions is that of use in agriculture, the use of these compounds is not limited to such. They may be used in pharmacology, cosmetology, general sanitation and may be formulated as creams, ointments, powders, solutions, emulsions for such applications.

EXAMPLE 1

To make the mono-sodium salt of hexachlorophene I first make a hot liquid hexachlorophene by dissolving 99 grams of 2,4,5 trichlorophenol in 50 grams of methyl alcohol. I then add 21 grams of 37% formaldehyde and 50 grams of sulfuric acid. I then add four volumes of water with continued heat and agitation. I separate the water from the liquid reaction mixtures. I then wash the reaction mixture twice with boiling water and separate. Approximately 100 grams of the hot liquid hexachlorophene remains which crystallizes on cooling. However, the hot liquid hexachlorophene is dissolved in an equal amount (100 grams) of methyl alcohol. I then add to this solution a solution of 1.3 grams of 76% sodium hydroxide in 20 grams of methyl alcohol. The mixture is stirred and the reaction takes place. The alcohol is distilled and the compound is recovered as a white powder which is more soluble in all commonly used solvents than hexachlorophene.

EXAMPLE 2

To make the mixed alkali salts of hexachlorophene, I dissolve 1 mol (57 grams) of potassium hydroxide and 1 mol (51 grams) of 78% sodium hydroxide in 2 quarts of methyl alcohol. I then dissolve 1 mol (407 grams) of hexachlorophene in 2 quarts of alcohol. Both solutions are heated to 50° C. and then mixed together. I then distill the alcohol and recover the dry compound which is off-white in color and more soluble than hexachlorophene in all solvents.

EXAMPLE 3

To make the di-sodium salt of hexachlorophene I dissolve 102 grams of 78% sodium hydroxide in 1000 grams of water. I add to this solution 407 grams of hexachlorophene, preferably in the hot liquid form. The sodium reacts with the hexachlorophene and dissolves it as the di-sodium salt forms. I then recover the off-white colored compound by distilling the water.

EXAMPLE 4

To make zinc hexachlorophene, I dissolve 137 grams (1 mol) of zinc chloride in 2 quarts of methyl alcohol. I then dissolve 407 grams of hexachlorophene (either in the hot liquid form or as a dry powder) in 2 quarts of methyl alcohol. I then heat both solutions to 50° C. and mix them together. I then stir and the reaction is complete within ten minutes. The alcohol is then distilled and the compound is recovered as a dry off-white colored powder which is less soluble in alcohol and acetone than hexachlorophene.

EXAMPLE 5

To make the manganese salt of hexachlorophene, I first dissolve 126 grams (1 mol) of manganese chloride in 1000 ml. of methyl alcohol. I then dissolve 407 grams of hexachlorophene in 1000 ml. of methyl alcohol. I heat both solutions to 50° C. I then slowly pour the manganese chloride solution into the hexachlorophene solution and stir. The reaction is complete within ten minutes. I then distill the alcohol and recover the compound as a dry powder which is a light gray-pink color and is less soluble in alcohol and acetone than hexachlorophene.

I have found that suitable formulations of my chemical inventions can be varied to suit a primary use, but that such formulations need not be limited to that primary use. Concentrations of the chemical in these formulations can range from one part of active chemical to 999 parts of carrier up to 100% active ingredients in a workable formulation. Examples of use formulations are as follows:

EXAMPLE 6

| | Percent |
|---|---|
| Mono-sodium hexachlorophene | 50 |
| Di-sodium hexachlorophene | 50 |

This formulation disperses and partially solubilizes in water and is suitable primarily for heavy applications to soil when added to water as a carrier and used as a drench or spray.

EXAMPLE 7

A general purpose liquid formulation but primarily adopted for application as a soil fungicide is as follows:

| | Percent |
|---|---|
| Di-sodium hexachlorophene | 15 |
| Mono-sodium hexachlorophene | 5 |
| Methyl alcohol | 60 |
| Water | 20 |

EXAMPLE 8

A dust formulation primarily for use as a seed treatment is as follows:

| | Percent |
|---|---|
| Mono-sodium hexachlorophene | 0.1 |
| Barden clay | 99.9 |

EXAMPLE 9

| | Percent |
|---|---|
| Mono-sodium hexachlorophene | 20.0 |
| Iso-bornyl acetate | 37.5 |
| Methyl alcohol | 37.5 |
| Prop. emulsifier Triton X-152 (Rohm & Haas Co.) | 3.0 |
| Prop. emulsifier Triton X-152 (Rohm & Haas Co.) | 2.0 |

EXAMPLE 10

A satisfactory wettable powder formulation for zinc hexachlorophene is as follows:

| | Percent |
|---|---|
| Zinc hexachlorophene | 25.0 |
| Barden clay | 55.0 |
| Pyrophyllite | 18.5 |
| Prop. wetting agent Triton X-120 (Rohm & Haas Co.) | 1.5 |

EXAMPLE 11

A liquid emulsifiable concentrate formulation found suitable for manganese hexachlorophene is:

| | Percent |
|---|---|
| Manganese hexachlorophene | 25 |
| Iso-bornyl acetate | 30 |
| Propylene glycol | 10 |
| Methyl alcohol | 20 |
| Triton X-152 | 10 |
| Triton 9D207 | 5 |

EXAMPLE 12

Another wettable powder formulation for general use has been found to be as follows:

| | Percent |
|---|---|
| Manganese hexachlorophene | 10 |
| Di-sodium hexachlorophene | 5 |
| Mono-sodium hexachlorophene | 10 |
| Barden clay | 75 |

Examples of performance of some of these compounds in actual practical field tests are as follows:

EXAMPLE 13

In a test of materials applied to Manalucie variety tomatoes one week ahead of planting on October 7 for control of Fusarium wilt, the following was observed six months later on March 23.

| Material and rate applied | Total plants | Total Fusarium | Green weight of ten plants | Percent diseased |
|---|---|---|---|---|
| Mono-sodium Hexachlorophene, 32# | 249 | 22 | 118.4# | 9 |
| Mono-sodium Hexachlorophene, 16# | 316 | 56 | 64.8# | 18 |
| No treatment | 283 | 82 | 57.9# | 29 |

EXAMPLE 14

In a test to determine the control of soil borne diseases attacking seedling contender beans under severe conditions, the following results were obtained:

| Material and rate applied per acre | Method of application | Percent survival of plants at bloom stage |
|---|---|---|
| (1) 0.1% Mono-sodium hexachlorophene dust 3#. | Seed-treatment | 62.4 |
| (2) 0.1% Mono-sodium hexachlorophene 5#. | Applied in furrow on top of seed. | 67.8 |
| (3) 10% Di-sodium hexachlorophene solution ¼ pint. | Applied in seed furrow | 71.2 |
| (4) 10% Di-sodium hexachlorophene solution ¼ pint. | Applied on top of row after covering. | 66.0 |
| (5) No treatment | | 40.2 |

EXAMPLE 15

In a test to determine the control of downy mildew (*Peronospora cubensis*) of cucumbers the following results were obtained:

| Treatment and amount per 100 gals. of spray | Number of actual disease lesions per rod of row after six applications at 5 day intervals |
|---|---|
| (1) Manganese hexachlorophene ⅔ pt. of 25% Emulsion Concentrate | 174 |
| (2) Mono-sodium hexachlorophene ¼ pt. of 25% Emulsion Concentrate | 708 |
| (3) No treatment | 2,286 |

EXAMPLE 16

In a test to determine the efficiency of control of the soil borne disease complex attacking seedling peppers and radishes under severe conditions, the following results were obtained:

| Treatment | Amount used per acre | Method of application | Stand count of pepper (percent) | Stand count of radish (percent) |
|---|---|---|---|---|
| (1) Di-sodium Hexachlorophene | 4# | Drenched in 300 gal. water after seeding. | 42.6 | 86.8 |
| (2) Mono-sodium Hexachlorophene | 6# | As in No. 1 | 18.2 | 83.0 |
| (3) Mono-sodium Hexachlorophene | 1 pt. 10% sol | Sprayed 3 times in 100 gal. W/A | 22.3 | 76.7 |
| (4) No treatment | | | 0.0 | 59.2 |

My new compounds may be used as the principal active ingredient in a number of formulations other than those of the foregoing examples. They may be utilized in solutions or emulsions with conventional solvents or dispersing agents, or they may be used in solid form with various clays, inert dusts and powders, alone or in combination with other insecticides, fungicides and/or bactericides as desired.

In my copending application Ser. No. 734,851, filed May 13, 1958, I have disclosed the use of hexachlorophene for controlling pathogenic organisms causing plant diseases. The action of this compound when applied to growing plants in the field is quite different from its activity as an antiseptic agent for animals generally. The present invention represents a further development of and improvement over the said earlier invention.

It will thus be understood that the foregoing disclosure relates only to preferred embodiments of the invention and that it is intended to cover all changes and modifications of the examples of the invention herein chosen for the purposes of the disclosure, which do not constitute departures from the spirit and scope of the invention.

What is claimed is:

1. A liquid emulsifiable composition for protecting organic materials from attack by microorganisms which comprises manganese hexachlorophene in a suitable solvent vehicle.

2. A composition for protecting organic materials from attack by microorganisms comprising zinc hexachlorophene admixed with an inert powdered diluent.

3. A dry composition for combatting infection comprising manganese hexachlorophene, disodium hexachlorophene and monosodium hexachlorophene admixed with a powdered inert inorganic diluent.

4. The method for protecting plants from attack by microorganisms which comprises treating the said plants with an effective amount of a metal derivative of bis-(3,5,6-trichloro-2 hydroxyphenyl) methane corresponding to the formula

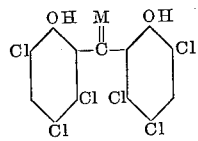

in which M is a metal from the group consisting of manganese, zinc, copper, iron, and nickel.

5. The method for protecting plants from attack by microorganisms which comprises treating the said plants with an effective amount of a metal salt of bis-(3,5,6-trichloro-2 hydroxyphenyl) methane corresponding to the formula

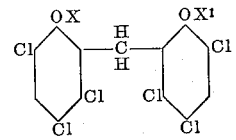

in which X and $X^1$ are the same or different radicals from the group consisting of sodium, potassium, lithium, and ammonium.

6. The method of combatting fungus infection in plants subject to attack by fungus which comprises spraying said plants and the surface of the ground in which they are growing with an effective amount of an aqueous spray containing as the principal active ingredient, manganese hexachlorophene.

7. The method for protecting growing plants from infections which comprises applying to the soil in which said plants are growing an effective amount of an alkali salt of hexachlorophene.

8. The method according to claim 4 in which the metal is zinc.

References Cited

UNITED STATES PATENTS

| | | | |
|---|---|---|---|
| 2,250,480 | 7/1941 | Gump | 167—31 X |
| 2,272,268 | 2/1942 | Gump | 260—619 |
| 2,353,725 | 7/1944 | Gump | 167—31 X |
| 2,354,012 | 7/1944 | Gump | 167—31 X |
| 2,378,310 | 6/1945 | Lynn et al. | 167—30 |
| 2,378,597 | 6/1945 | Horst | 167—30 |
| 2,622,092 | 12/1952 | Kozacik et al. | 260—429 |
| 2,734,088 | 2/1956 | Knowles et al. | 260—619 |
| 2,794,817 | 6/1957 | Bersworth | 260—249 X |
| 2,794,818 | 6/1957 | Bersworth | 260—429 X |
| 3,024,163 | 3/1962 | Harvey et al. | 167—31 |
| 3,064,024 | 11/1962 | Wilkinson | 260—429 |

OTHER REFERENCES

Frear: "Pesticide Index," College Science Publishers, State College, Pa., 1961, p. 118.

ALBERT T. MEYERS, *Primary Examiner.*

JULIAN S. LEVITT, *Examiner.*

GEORGE A. MENTIS, *Assistant Examiner.*